US008056307B2

(12) United States Patent
Roberge

(10) Patent No.: US 8,056,307 B2
(45) Date of Patent: Nov. 15, 2011

(54) MOWER CUTTERBAR

(75) Inventor: Martin Jean Roberge, Saskatoon (CA)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/573,861

(22) Filed: Oct. 5, 2009

(65) Prior Publication Data
US 2011/0078988 A1  Apr. 7, 2011

(51) Int. Cl.
*A01D 73/30* (2006.01)
(52) U.S. Cl. .................................................. 56/6
(58) Field of Classification Search ........... 56/6, 13.6, 56/255, 295, DIG. 20, DIG. 24
See application file for complete search history.

(56) References Cited

U.S. PATENT DOCUMENTS

| | | | |
|---|---|---|---|
| 4,110,959 A | | 9/1978 | Oosterling et al. |
| 4,292,790 A * | | 10/1981 | Mathews ................. 56/13.6 |
| 4,299,077 A * | | 11/1981 | Wattron ................... 56/13.6 |
| 4,304,088 A | | 12/1981 | Werner |
| 4,330,982 A * | | 5/1982 | Vissers et al. ............. 56/192 |
| 4,723,396 A * | | 2/1988 | Ermacora ................. 56/13.6 |
| 4,815,262 A | | 3/1989 | Koch et al. |
| 4,879,870 A | | 11/1989 | Neuerburg |
| 4,903,470 A * | | 2/1990 | Hemker et al. ............. 56/228 |
| 4,972,664 A | | 11/1990 | Frey |
| 5,012,635 A | | 5/1991 | Walters et al. |
| 5,094,063 A | | 3/1992 | Wattron et al. |
| 5,272,859 A * | | 12/1993 | Pruitt et al. ............... 56/15.2 |
| 5,433,064 A | | 7/1995 | Schmitt et al. |
| 5,964,079 A | | 10/1999 | Mellin et al. |
| 5,996,323 A | | 12/1999 | Campbell et al. |
| 6,796,204 B2 * | | 9/2004 | Verhulst et al. .................. 74/640 |
| 6,837,033 B2 * | | 1/2005 | Schlesser et al. ............. 56/14.9 |
| 7,024,844 B2 * | | 4/2006 | Schlesser et al. ............. 56/14.9 |
| 7,043,889 B2 * | | 5/2006 | Rauch ............................ 56/15.9 |
| 7,051,501 B2 * | | 5/2006 | Schlesser et al. ............. 56/15.2 |
| 7,165,381 B2 * | | 1/2007 | Rosenbalm et al. ................ 56/6 |
| 7,181,897 B2 | | 2/2007 | Walter et al. |
| 7,356,982 B2 * | | 4/2008 | Barnett ............................ 56/153 |
| 7,454,888 B2 * | | 11/2008 | Barnett ............................ 56/14.7 |
| 7,461,498 B1 * | | 12/2008 | Barnett ............................ 56/192 |
| 7,596,935 B2 * | | 10/2009 | Bollinger et al. ............. 56/14.9 |
| 7,658,056 B2 * | | 2/2010 | Thompson et al. ............ 56/15.8 |
| 7,661,253 B2 * | | 2/2010 | Pruitt et al. ..................... 56/13.6 |
| 7,669,391 B2 * | | 3/2010 | Eubanks et al. ...................... 56/6 |
| 7,726,108 B1 * | | 6/2010 | Pruitt et al. ...................... 56/14.5 |
| 7,726,109 B2 * | | 6/2010 | Thompson et al. ............ 56/15.8 |
| 2008/0066440 A1 * | | 3/2008 | Barnett ............................ 56/14.5 |
| 2009/0071116 A1 * | | 3/2009 | Barnett ............................ 56/153 |

FOREIGN PATENT DOCUMENTS

| | | |
|---|---|---|
| DE | 10310322 A1 | 10/2003 |
| EP | 1776855 A1 | 10/2006 |
| WO | 9528825 | 11/1995 |

* cited by examiner

*Primary Examiner* — Arpad Fabian-Kovacs
(74) *Attorney, Agent, or Firm* — Patrick M. Sheldrake

(57) ABSTRACT

A gear-driven modular disc cutter assembly that may be used singly or in combination on a header of an agricultural harvester to form a modular disc cutterbar. The modules feature a low profile to minimize disruption of incoming crop flow and are coordinated such that any two adjacent cutters are either converging or diverging the crop flow (e.g. any two adjacent cutters rotate in opposite directions). Additionally, the modules are suitable for mounting on a movable frame which allows the cutterbar to be folded in a horizontal plane to reduce the transverse width of the cutterbar to facilitate transport of the harvester between fields.

9 Claims, 4 Drawing Sheets

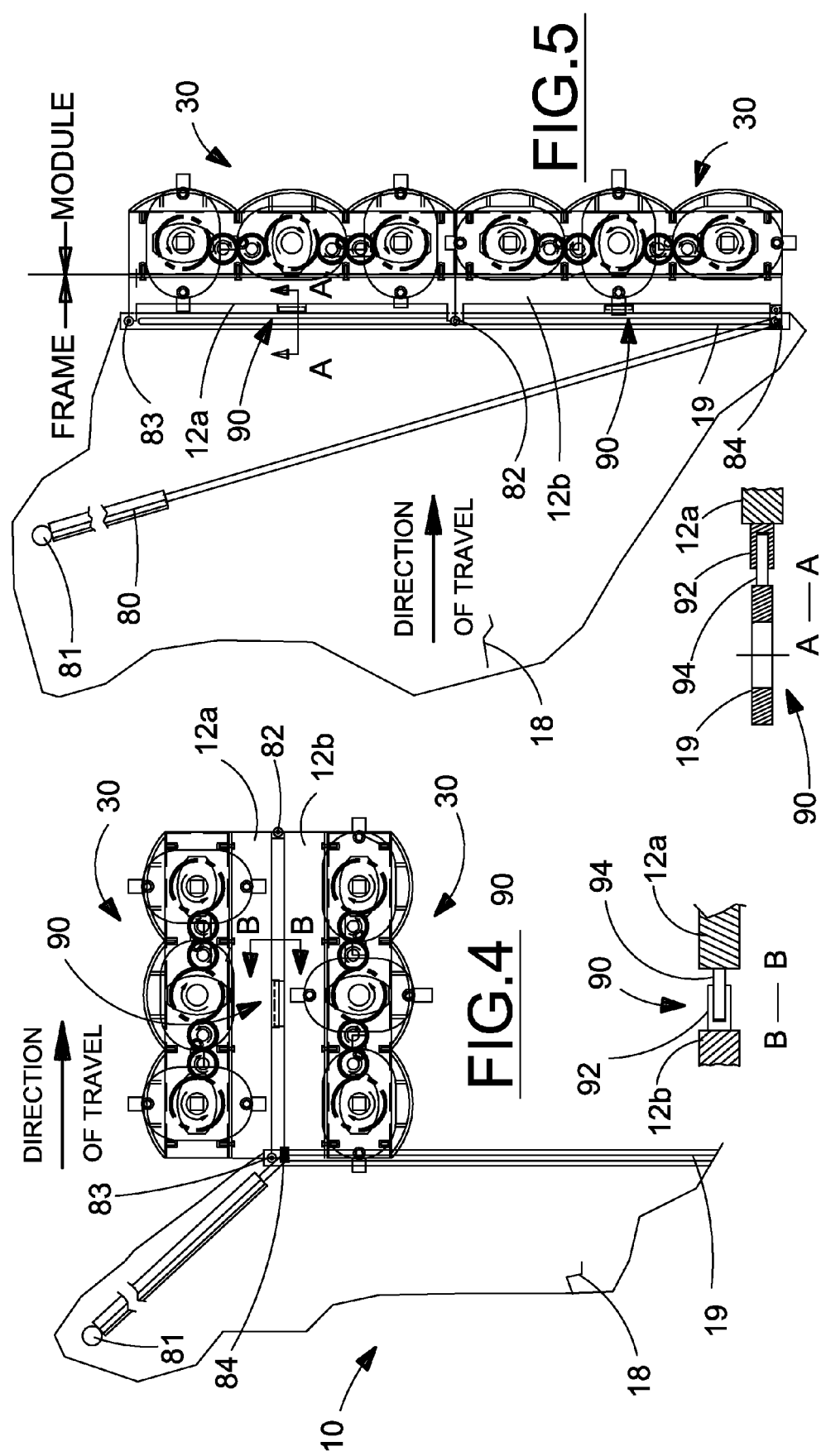

MOWER CUTTERBAR

BACKGROUND OF THE INVENTION

This invention relates generally to a machine for severing standing crops from the ground to initiate a harvesting process and, more particularly, to a cutterbar having a preselected number of low-profile, modular rotary cutter units mountable on a movable frame which allows the cutterbar width to reduced for transport.

One common type of modular disc cutterbars used in agriculture includes a plurality of individual rotary disc cutter modules, each having a self-contained drive mechanism, modularly interconnected by spacers and drive shafts spanning a header to form the cutterbar. The modular nature of the cutter modules isolates contamination of the drive mechanism occurring in the event of a failure of a single cutter module. Limiting the spread of debris from a failed module reduces the corrective maintenance necessary to replace the failed module. The disadvantage to a modular design of this type is that a higher profile (compared to other designs) cutterbar is necessitated by the space for a transverse shaft driveline interconnecting adjacent cutter modules. Higher profile cutterbars tend to negatively influence crop flow across the cutterbar and into the header.

Cutterbars frequently impact rocks and other obstructions in a field which can damage the cutterhead or the cutterhead driveline. Modular cutterhead designs allow an individual damaged cutterhead to be removed and replaced without affecting adjacent cutterhead modules. The modular design contains debris from gear failures within an individual module oil sump and reduces debris contamination of adjacent modules. However, replacing a single damaged cutterhead module is not an insignificant task requiring significant disassembly of the cutter bar in order to remove a damaged cutterhead from the cutterbar driveline because of intermediate drive shafts disposed between adjacent modules to transfer power laterally along the cutterbar.

Known gear-driven cutterbar designs generally include an elongate housing containing a train of meshed idler and drive spur gears for delivering power from one or more input shafts to respective cutterheads spaced along the length of the cutterbar. The housing typically extends substantially the entire transverse width of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear intermeshed with the drivetrain spur gears. Known gear-driven cutterbars cannot be folded or otherwise reconfigured to allow the cutterbar width to be reduced in order to improve transportability of a harvester between distant field locations.

It would be advantageous to have a modular cutterbar design incorporating the low profile advantages of a gear-driven driveline and the modularized housings which compartmentalize the drive-train housing in order to limit the spread of debris following a failure in one of the cutterheads and further to reduce the degree of cutterbar disassembly necessary to remove and replace a damaged module. Further advantages would be realized by a cutterhead module design that would allow variations in cutterbar width by varying the number of modules used thereby enabling one module design to be used on a number of cutterbars. Still further advantages would be realized in a cutterbar having multiple modules by mounting the modules on a movable frame that would allow a cutterbar width to be reduced to facilitate transport.

SUMMARY OF THE INVENTION

Accordingly, the present invention, in any of the embodiments described herein, may provide one or more of the following advantages:

It is an object of the present invention to provide a modular cutterbar that incorporates the advantages of a low-profile, gear-driven cutterbar and modular assembly technique.

It is a further object of the present invention to provide a modular cutterbar design that incorporates a standard width cutterhead module thereby allowing use on a variety of headers, including headers for self-propelled and pull-behind mowers.

It is a further object of the present invention to provide a modular cutterbar design that incorporates counter-rotating individual disc cutters whereby adjacent cutters are either converging or diverging.

It is a further object of the present invention to provide a modular cutterbar design that offers a thinner profile compared to other known modular cutterbar designs.

It is a further object of the present invention to provide a gear-driven modular disc cutter design that reduces the component part count compared to modular cutterbars having a series of drive shafts and bevel gears.

It is a still further object of the present invention to provide a gear-driven disc cutter module for use on a collapsible cutterbar frame which enables the cutterbar to be folded in a horizontal plane thereby reducing the transverse width of the cutterbar to improve transportability.

It is a still further object of the present invention to provide a gear-driven disc cutter module for use on a foldable cutterbar than can be quickly and easily repositioned between folded and unfolded positions.

It is a still further object of the present invention to provide a gear-driven modular disc cutterbar that may be configured on a foldable frame while retaining a power take-off drive that enables rotation of individual disc cutters to be synchronized.

It is a still further object of the present invention to provide a gear-driven modular disc cutters design for use on a header that is durable in construction, inexpensive of manufacture, carefree of maintenance, easily assembled, and simple and effective to use.

These and other objects are achieved in accordance with the instant invention by providing a gear-driven modular disc cutter assembly that may be used singly or in combination on a header of an agricultural harvester to form a modular disc cutterbar. The modules feature a low profile to minimize disruption of incoming crop flow and are coordinated such that any two adjacent cutters are either converging or diverging the crop flow (e.g. any two adjacent cutters rotate in opposite directions). Additionally, the modules are suitable for mounting on a movable frame which allows the cutterbar to be folded in a horizontal plane to reduce the transverse width of the cutterbar to facilitate transport of the harvester between fields.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a partial plan view of one embodiment of the cutterbar shown in the partially retracted (non-operating) position as would be useful for transport; and FIG. 5 is a partial plan view of the cutterbar of FIG. 4 shown in the extended (operating) position.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
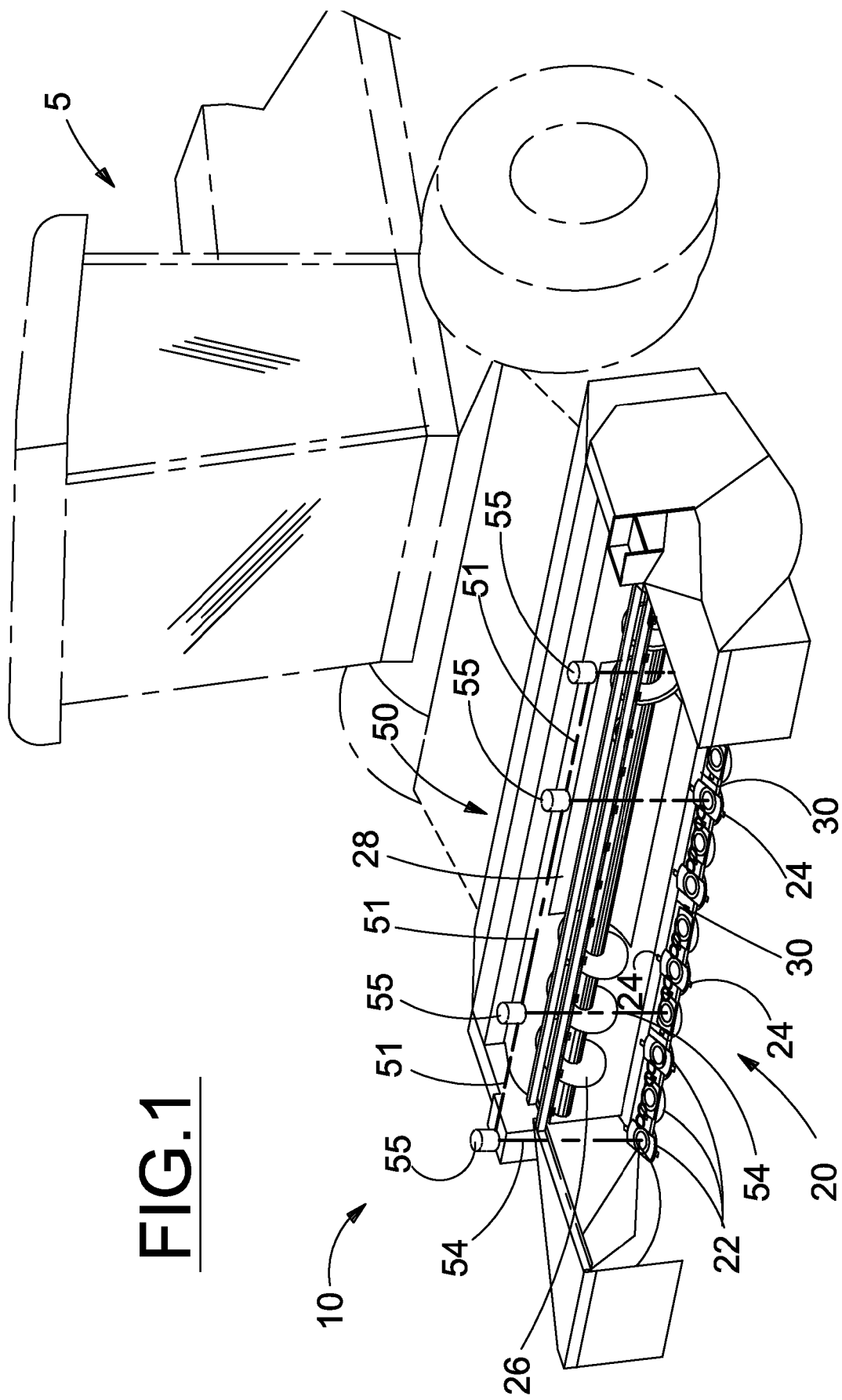
FIG. 1 is a partial perspective view of an agricultural harvester having a header of the type on which the present invention is useful.

Referring now to the drawings and particularly to FIG. 1, a header 10 having a disc cutterbar 20 of the type on which the present invention finds utility is presented. Disc cutterbars have been utilized in agricultural harvesting implements for many years. Each disc cutterbar includes a plurality of transversely spaced disc cutters 22 driven by a drive apparatus 50 for rotation about a generally vertical axis. Each disc cutter 22 has two or three knives 24 pivotally mounted on the periphery thereof to sever standing crop from the ground through an impact action as the disc cutter rotates. The cutterbar 20 is transversely aligned on the header 10 so that it perpendicularly intercepts standing crop as the header is propelled across the ground. Header 10 may also include mechanisms to manage crop flow within the header, such as auger 26, and a crop conditioner 28. As presented herein, header 10 is forwardly connected to a tractor 5 in a combination commonly known as a self-propelled windrower; however, the utility of the present invention is not limited to self-propelled machines, but is equally useful on any agricultural crop harvesting header. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

Figure 2:
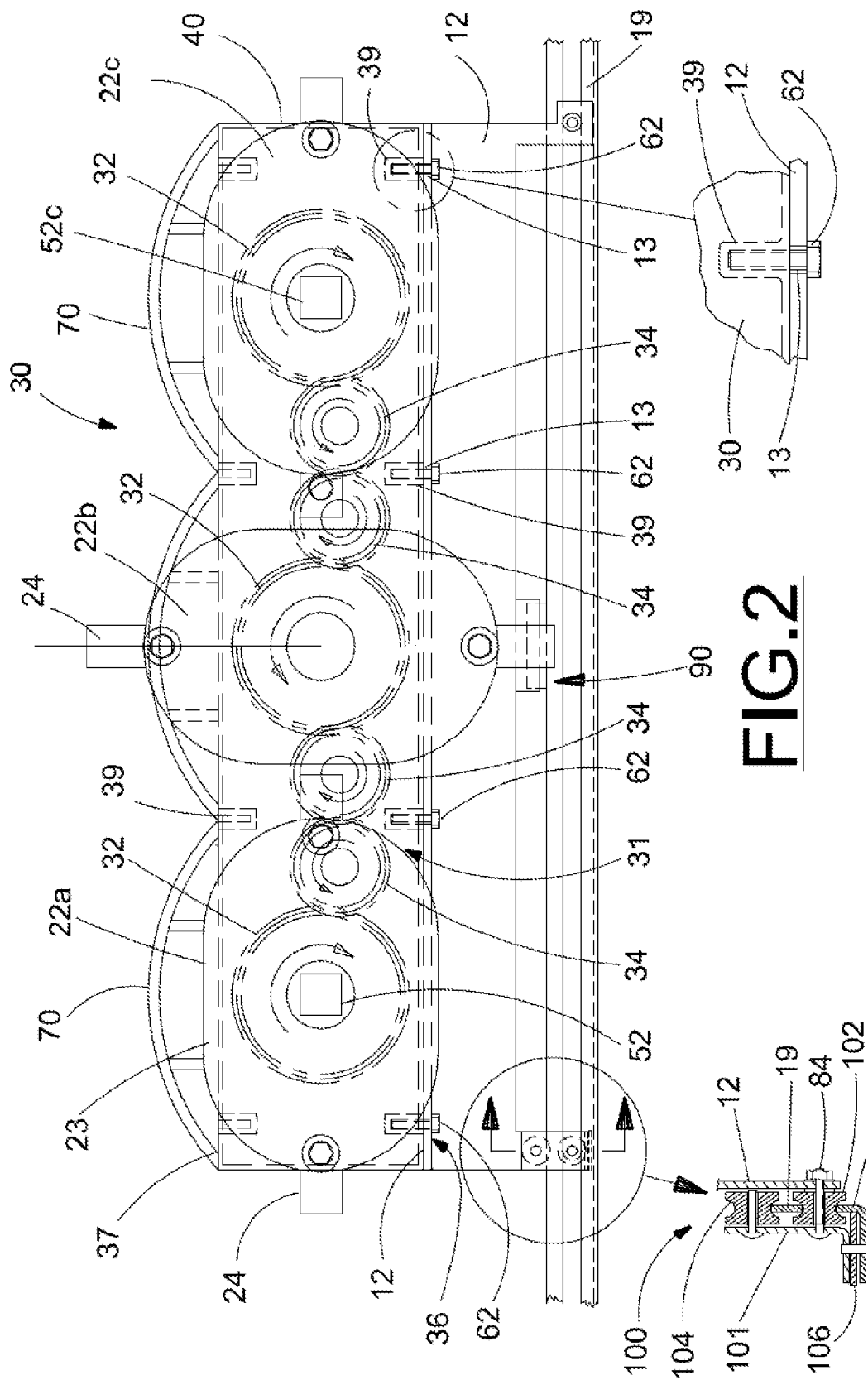
FIG. 2 is a partial plan view of a disc cutter module assembly incorporating the improvements of the instant invention wherein the module may be connected to the cutterbar in more than one orientation.

Now referring to FIG. 2, a modular disc cutter assembly 30 embodying the present invention is shown comprising three individual disc cutters, first, second, and third disc cutters 22a, 22b, 22c, respectively, rotatably connected a housing structure 40. The individual disc cutters are rotationally interconnected by drive mechanism 31 comprising a plurality of drive gears 32 and spur gears 34 such that the disc cutters rotate simultaneously. Rotational input power is received from the tractor power takeoff through an input connection 52 provided on the first disc cutter 22a. Each disc cutter includes a drive gear 32 rotationally coupled to the disc cutter head 23 to provide rotation in unison. Spur gears 34 intermesh with adjacent drive gears 32 to convey the rotational power to each disc cutter 22 on the module assembly. The drive gears 32, spur gears 34, and necessary bearings are contained within housing structure 40 where they are protected from contamination by the crop material. Housing 40 preferably provides full enclosure for the gears and thus the option of containing a lubricant for the gears of the drive mechanism. The drive mechanism 31 is configured such that the first and third disc cutters 22a, 22c rotate in the same relative direction while the second disc cutter 22b rotates in the opposite direction. As a result, the disc cutters on the module assembly are arranged so that one adjacent pair of cutters (e.g., 22a, 22b) will converge incoming crop material therebetween while the other adjacent pair of disc cutters (e.g., 22b, 22c) will produce divergent crop material flow. The arrangement enables multiple module assemblies to be arranged in a cutterbar to provide the desired crop material flow between individual disc cutters.

Figure 3:
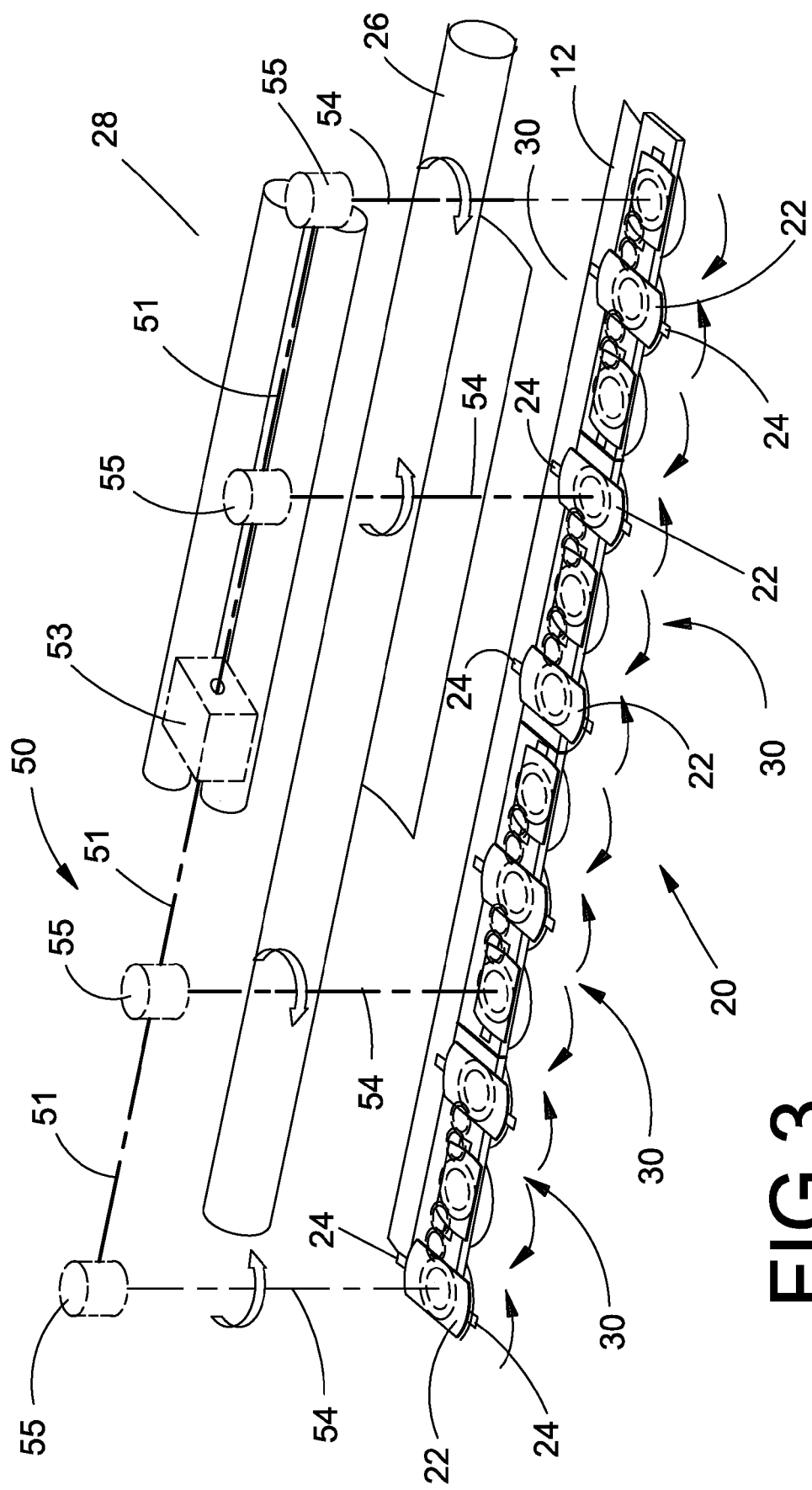
FIG. 3 is a partial perspective view of one embodiment of the cutterbar shown in the extended (operating) position.

Now referring to FIGS. 2 and 3, each cutter module assembly 30 is connected to a frame 12 which affixes the modules assemblies to the structure of the header 12 and orients the modules assemblies relative to each other to form the cutterbar 20. The connection is preferably by a plurality of fasteners 62. In the embodiment shown, the fasteners 62 are capscrews simultaneously engaging holes 13 in the frame 12 and threaded openings 39 in the module 30. Module 30 includes threaded openings 34 that are aligned on opposing sides 36, 37 which enables module 30 to be mounted in one of two orientations on frame 12, the orientations being rotated 180 degrees from each other. The reversible orientation enables the first disc cutter 22a to thus be positioned at either end of the module, relative to the cutterbar and thereby assures that the proper arrangement of disc cutter rotation directions (converging or diverging crop flow) for adjacent cutters on adjacent modules can be obtained. Openings 34 on the side opposite frame 12 may also be used for connection of rock guards 70, skid shoes (not shown), or other appurtenances on the cutter module assembly. The modules 30 are uniformly sized and configured for manufacturing and assembly ease. Uniformity also enables the symmetry in the housing 30 that enables the reversible connection to the frame 12. In one embodiment the disc cutter assembly can have a second input connection 52c connected to the third disc cutter 22c for receiving rotational power from the header. The second input connection 52c enables the power drive 50 to be positioned at either end of each module in either mounting orientation.

Cutterbar 20 comprises multiple module assemblies 30 connected generally end-to-end to form an uninterrupted array of disc cutters 22 across the transverse width of the cutterbar, shown in FIG. 3. Drive apparatus 50 is connected to header 10 and configured to provide rotational energy to each of the individual module assemblies 30 comprising the cutterbar 12. Drive apparatus 50 includes a driver 53 which receives power from the tractor 5 using well-known power take-off means, such as hydraulic or mechanical, and transfers the power preferably through a series of lateral transfer shafts 51 driving gearboxes 55 and drop-down shafts 54. The number of gearboxes 55 and drop-down shafts 54 is equal to the number of module assemblies 30 present on the cutterbar.

Each drop-down shaft 55 is rotationally connected to the input connection 52 on the module assembly 30. Gearboxes 55 are interlinked to enable all of the disc cutters on the cutterbar to be synchronized to prevent inadvertent contact of the rotating knives 24 and configured to provide the direction of rotation necessary to coordinate the converging/diverging crop movement through the cutterbar. While a specific mechanical drive apparatus 50 comprising rotating shafts and gearboxes is described, one skilled in the art will recognize numerous means for conveying rotational power from the tractor PTO to the module assemblies 30 or drop-down shafts 54 which are within the scope and spirit of the present invention.

Now referring to FIGS. 4 and 5, wherein an alternate embodiment of the invention is shown in which frame 12 of cutterbar 20 is selectively movable between two positions. In FIG. 4, the cutterbar 20 is shown in a folded position wherein the module assemblies 30 are pivoted in relation to each other thereby reducing the width of the cutterbar. Pivoting motion may result in an angled relation between the adjacent modules up to the position in which the transverse lengths are parallel, as shown in FIG. 4. The folded position is useful for header transport when the transverse width of the header often needs to be reduced. In contrast, FIG. 5 shows the cutterbar 20 in the extended position as it would be positioned during operation. Movement of the cutterbar 20 is enabled though the addition of a pivoting connection 82 in frame 12, separating the frame 12 into at least a first portion 12a and a second portion 12b. Actuator 80 is connected at fixed end 81 to the header chassis 18 and to a point on the movable frame at the other, either the pivoting connection 82 or the sliding connection 84, shown in FIGS. 4 and 5. Reversing the direction of movement of actuator 80 when the cutterbar is in the folded position returns sliding connection 84 to its distalmost position, moves pivoting connection 82 rearwardly and returns the cutterbar to a generally straight, transverse alignment. Alternatively, by fixing the position of first end 83, the modules will be folded and moved laterally toward the fixed end 83. While FIGS. 4 and 5 are shown with two module assemblies 30, extending the first and second portions 12a, 12b would allow two or more modules assemblies to be attached to each portion to achieve the desired cutterbar width.

Actuator 80 is preferably a hydraulic cylinder or linear actuator capable of moving the sliding end 84 transversely relative to the header 10. As the sliding end 84 is moved toward the fixed end connection 83, pivoting connection 82 is moved forwardly. A sliding engagement structure 19 allows the ends 84 to move inwardly as the pivoting connection moves forwardly. In one embodiment, sliding end 84 comprises a vertically oriented guide roller traversing along the vertically open, slot-like engagement structure 19. Increasing the height of the sliding end 84 guide roller and thickness of the member in which engagement structure 19 is formed allows lateral translation motion while providing moment resistance in about the transverse axis. An alternate embodiment of sliding end 84 is provided in FIG. 2 wherein a sliding connector mechanism 100 is connected to movable frame 12 and comprises a pair of guide rollers 102, 104 which cooperatively engage guide structure 19 in a manner to produce a moment-resistant connection. Optionally, a stabilizer roller 106 may also be included to provide increases stiffness in the connection to better support the modules 30 when in the folded position. One skilled in the art will recognize numerous alternative for a moment-resistant, sliding connection device for sliding end 84. Such alternatives are contemplated within the scope and spirit of the invention.

Structural stability of the foldable cutterbar is enhanced through the inclusion of one or more stabilizer structures 90 on first and second portions 12a, 12b and the stationary portion of frame 12. Each stabilizer structure 90 comprises a first element 92 and a second element 94 configured to enable sliding engagement and, once engaged, restrict relative vertical motion between a movable portion, 12a or 12b, and the stationary portion 19 of the frame. By altering the relative positions of first and second elements 92, 94 with respect to the frame 12,19, the stabilizer 90 can be configured to allow engagement when the cutterbar is folded (shown in FIG. 4). When the cutterbar is folded, the stabilizer structures on two adjacent portions of the frame, 12a, 12b are configured so that a first element 92 on first portion 12a will engage with a second element 94 on the other frame portion 12b and restrain relative vertical movement between the frame portions while the frame is folded. modules.

In yet another embodiment, the cutterbar frame 12 may be divided into as many portions as modules comprising the cutterbar. For example, a four module cutterbar comprises two adjacent folding mechanisms similar to those shown in FIGS. 4 and 5. By positioning fixed ends 83 centrally on the cutterbar (e.g., proximate to the longitudinal centerline of the header) and providing actuators, folding the cutterbar will draw the outboard ends 84 inwardly toward the header centerline. In one embodiment, each module assembly is approximately 1.5 meters in width, so cutterbars having more than four modules (6 meters total width) may become impractical to operate and thus find limited application on the largest mowers.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A modular disc cutterbar for an agricultural crop harvesting header, the header having generally opposing sides with a transverse axis spanning therebetween, said cutterbar comprising:

a transverse frame connected to the header;

a plurality of modular disc cutter assemblies connected to said frame, each said modular disc cutter assembly further comprising:

an elongate housing configured to be connected to said frame in either a first orientation or a second orientation wherein said first and second orientations are reverse from one another, wherein in the first orientation the housing is mounted to the frame such that a first elongate edge is adjacent the frame and in the second orientation a second elongate edge of the housing on an opposite side of a drive mechanism is adjacent the frame;

the elongate housing having mounting arrangements configured for attachment to the frame along both a first and opposing second transverse lengths of the cutter disc assembly such the module is mountable in either a first or second orientation;

a first disc cutter rotatably connected to said housing, said first disc cutter having a first input connection for receiving rotational power from the header;
a second disc cutter rotatably connected to said housing and laterally displaced from said first disc cutter;
a third disc cutter rotatably connected to said housing and laterally displaced from said second disc cutter along an axis extending between said first and second cutters; and
the drive mechanism configured to transfer rotational energy from said first input connection to said first, second, and third disc cutters and thereby cause said cutters to rotate, wherein said first and third disc cutters rotating in a first direction, said second disc cutter rotation in a second direction opposite to said first direction;
a power drive apparatus configured to provide rotational energy to said first input connection whereby said disc cutter assemblies are configured such that adjacent disc cutters are always rotating in opposite directions providing converging or diverging crop flow between adjacent disc cutters.

2. The cutterbar of claim 1, wherein said drive mechanism is a plurality of gears rotationally interconnecting said first, second, and third disc cutters.

3. The cutterbar of claim 2, wherein said plurality modular disc cutter assemblies is an even number of said assemblies.

4. The cutterbar of claim 3, wherein said power drive apparatus is configured to rotationally coordinate rotational movement of each respective disc cutter thereby preventing unintentional contact between adjacent disc cutters.

5. The cutterbar of claim 4, wherein said power drive apparatus comprises a mechanical connection between each respective first input connection.

6. A modular disc cutterbar for an agricultural crop harvesting header, the header having generally opposing sides with a transverse axis spanning therebetween, said cutterbar comprising:
a transverse frame connected to the header;
a plurality of modular disc cutter assemblies connected to said frame, each said modular disc cutter assembly further comprising:
an elongate housing configured to be connected to said frame in either a first orientation or a second orientation wherein said first and second orientations are reverse from one another;
a first disc cutter rotatably connected to said housing, said first disc cutter having a first input connection for receiving rotational power from the header;
a second disc cutter rotatably connected to said housing and laterally displaced from said first disc cutter;
a third disc cutter rotatably connected to said housing and laterally displaced from said second disc cutter along an axis extending between said first and second cutters; and
a drive mechanism configured to transfer rotational energy from said first input connection to said first, second, and third disc cutters and thereby cause said cutters to rotate, wherein said first and third disc cutters rotating in a first direction, said second disc cutter rotation in a second direction opposite to said first direction;
a power drive apparatus configured to provide rotational energy to said first input connection whereby said disc cutter assemblies are configurable so that adjacent disc cutters are always rotating in opposite directions providing converging or diverging crop flow between adjacent disc cutters;
wherein said drive mechanism is a plurality of gears rotationally interconnecting said first, second, and third disc cutters;
wherein said plurality of modular disc cutter assemblies is an even number of said assemblies;
wherein said power drive apparatus is configured to rotationally coordinate rotational movement of each respective disc cutter thereby preventing unintentional contact between adjacent disc cutters; and
wherein said frame is selectively movable between a first position and a second position, said first position configuring said plurality of cutter assemblies generally transverse to the header, said second position configuring said plurality of cutter assemblies angled to the transverse axis thereby reducing the transverse width of the cutterbar, wherein at least two of the plurality of disc cutter bar assemblies are adjacent and connected by a pivot therebetween, wherein the pivot is further from the transverse axis in the second position than in the first position.

7. The cutterbar of claim 6, further comprising at least one actuator interconnecting said frame and said header, said at least one actuator configured to move said frame between said first and said second positions and wherein the ends of the pivotally connected disc cutter bar assemblies opposite the pivot connection are moved closer to one another as the frame is moved from the first position to the second position.

8. The cutterbar of claim 7, further comprising a plurality of stabilizer mechanisms for said frame, each said stabilizer mechanism having a first element and a second element located on the frame adjacent the respective modules and configured to physically engage one another in a manner to restrain relative motion along a vertical axis therebetween when engaged, said plurality of stabilizer mechanisms disposed on said frame such that said plurality of mechanism are engaged when said frame is in said first position or said second position, and are not engaged when said frame is not in said first position or said second position.

9. A disc cutterbar for an agricultural header, the header having generally opposing sides with a transverse axis spanning therebetween, said cutterbar comprising:
a transverse frame connected to the header;
a plurality of modular disc cutter assemblies connected to said frame, each said modular disc cutter assembly further comprising:
an elongate housing configured to be connected to said frame in either a first orientation or a second orientation wherein said first and second orientations are reverse from one another;
a first disc cutter rotatably connected to said housing, said first disc cutter having a first input connection for receiving rotational power from the header;
a second disc cutter rotatably connected to said housing and laterally displaced from said first disc cutter;
a third disc cutter rotatably connected to said housing and laterally displaced from said second disc cutter along an axis extending between said first and second cutters; and
a drive mechanism configured to transfer rotational energy from said first input connection to said first, second, and third disc cutters and thereby cause said cutters to rotate, said first and third disc cutters rotating in a first direction, said second disc cutter rotating in a second direction opposite to said first direction;

a power drive apparatus connected and configured to provide power to the first input connection of each disc cutter assembly whereby said disc cutter assemblies are configurable so that adjacent disc cutters are rotating in opposite directions in order provide converging or diverging crop flow between any two adjacent disc cutters and manage crop flow past the cutterbar and into the header wherein each disc cutter assembly further comprises a second input connection connected to said third disc cutter for receiving rotational power from the header, said second input connection in conjunction with said first and second orientations for connecting said module to said frame thereby enabling each said power drive apparatus to be positioned at either end of each of said plurality of modules, wherein both said first input and said second input are configured for alternatively driving all three disc cutters.

\* \* \* \* \*